United States Patent [19]

Ishii et al.

[11] Patent Number: 4,828,283
[45] Date of Patent: May 9, 1989

[54] FOUR WHEEL STEER VEHICLE CONTROL SYSTEM RESPONSIVE TO SUSPENSION CHARACTERISTIC CHANGE

[75] Inventors: Katsumi Ishii, Sagamihara; Yoshio Matsuoka, Tokyo, both of Japan

[73] Assignee: Nissan Motor Co., Ltd., Japan

[21] Appl. No.: 929,424

[22] Filed: Nov. 12, 1986

[30] Foreign Application Priority Data

Nov. 13, 1985 [JP] Japan .................... 60-254497

[51] Int. Cl.$^4$ ................... B62D 6/02; B60G 17/00
[52] U.S. Cl. ..................... 280/91; 180/140; 364/424.05; 280/707
[58] Field of Search .......... 280/91, 707, 661; 140/140, 142; 364/424.05

[56] References Cited

U.S. PATENT DOCUMENTS

| | | | |
|---|---|---|---|
| 4,412,594 | 11/1983 | Furukawa et al. | 180/142 |
| 4,545,602 | 10/1985 | Shibahata | 280/91 |
| 4,555,126 | 11/1985 | Ishimitsu et al. | 280/707 |
| 4,573,705 | 3/1986 | Kanai et al. | 280/707 |
| 4,598,788 | 7/1986 | Serizawa | 180/140 |
| 4,616,847 | 10/1986 | Kanai et al. | 280/707 |
| 4,705,130 | 11/1987 | Fukunaga et al. | 180/140 |
| 4,715,466 | 12/1987 | Ishii et al. | 180/233 |
| 4,716,982 | 1/1988 | Ishii et al. | 180/140 |

FOREIGN PATENT DOCUMENTS

59-81263 5/1984 Japan .
2154523 9/1985 United Kingdom .................. 280/91

Primary Examiner—Charles A. Marmor
Assistant Examiner—Karin Tyson
Attorney, Agent, or Firm—Leydig, Voit & Mayer

[57] ABSTRACT

A four wheel steer vehicle is provided with a suspension control system for controlling at least one suspension characteristic, one or more sensors for sensing a change in suspension characteristics by sensing a condition of the suspension control system, and a controlling element for varying a ratio of a rear wheel steer angle to a steering wheel angle in accordance with the suspension characteristic. Examples of the suspension characteristics are spring constants of front and rear suspensions, heights of the front and rear suspensions, damping forces of the front and rear suspensions, roll stiffnesses of the front and rear suspensions, and front wheel alignment angles such as camber and toe-in.

10 Claims, 6 Drawing Sheets

FOUR WHEEL STEER VEHICLE CONTROL SYSTEM RESPONSIVE TO SUSPENSION CHARACTERISTIC CHANGE

CROSS REFERENCES TO RELATED APPLICATIONS

The following patent applications relate to subject matter similar to that of the present application (1) U.S. Pat. No. 4,716,982, Inventors=ISHII et al., Corresponding foreign prior application=Japanese patent application No. 60-254498. (2) U.S. Pat. No. 4,715,466, Inventors=ISHII et al., Corresponding foreign prior application=Japanese patent application No. 60-260948.

BACKGROUND OF THE INVENTION

The present invention relates to a four wheel steer vehicle having a suspension control system capable of varying a suspension characteristic such as suspension spring constant, vehicle height, suspension damping force or suspension geometry.

Japanese patent un-examined publication No. 59-81263 discloses a conventional four wheel steer vehicle. The vehicle of this example has a front wheel steering system, a rear wheel steering system, and a controller for controlling the rear wheel steering system in accordance with one of three steering modes such as an automatic control mode in which a characteristic of a rear wheel steer angle with respect to a front wheel steer angle is changed in accordance with driving condition, a fixed mode in which such a characteristic is fixed regardless of the driving condition, and a two wheel steer mode in which the rear wheel steer angle is fixed at zero regardless of the driving condition. The controller controls the rear wheel steer angle in accordance with one of three steering modes, by using the front wheel steer angle, vehicle speed, and rear wheel steer angle sensed by sensors. In this system, however, the rear wheel steer angle is determined without regard to a suspension characteristic. Therefore, this system is unable to maintain the desired vehicle characteristic of straight ahead driving and cornering when a change is made in front and rear suspension characteristics which affect the vehicle cornering characteristic and straight ahead driving characteristic.

SUMMARY OF THE INVENTION

It is an object of the present invention to provide a four wheel steer vehicle for controlling a rear wheel steer angle adequately even when a suspension characteristic is changed.

According to the present invention, a four wheel steer vehicle comprises a suspension control means, a suspension characteristic sensing means, a four wheel steer system for steering right and left rear wheels in response to a control signal, and a controlling means. The suspension control means is arranged to vary at least one suspension characteristic such as a spring constant of a suspension spring, vehicle height, roll stiffness of a stabilizer, damping force of a shock absorber, camber of a wheel, and toe-in. The suspension characteristic sensing means senses the suspension characteristic by sensing a condition of the suspension control system. The controlling means varies a ratio of a rear wheel steer angle of a steering wheel angle in accordance with the suspension characteristic sensed by the suspension characteristic sensing means.

DETAILED DESCRIPTION OF THE INVENTION

Figure 1:
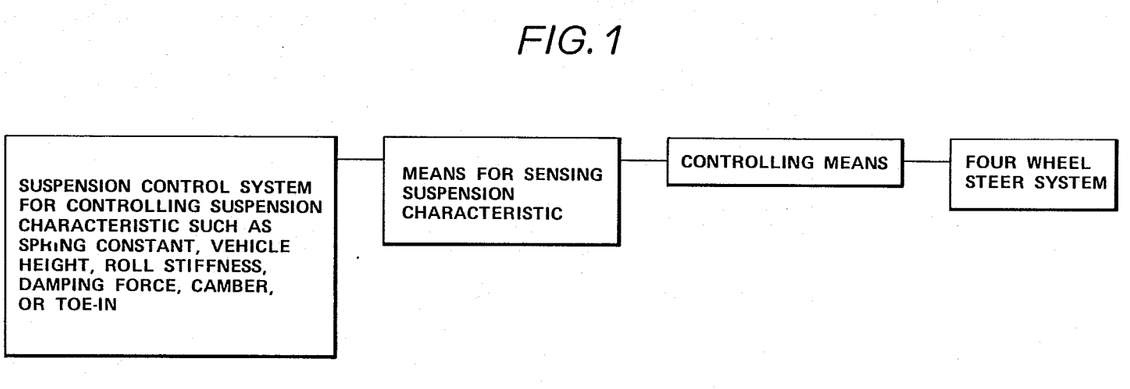
FIG. 1 is a block diagram showing a control system of the present invention.

FIG. 1 shows a control system of the present invention which includes a suspension control system for controlling at least one suspension characteristic, a means for sensing the suspension characteristic, a controlling means and a four wheel steer system.

A first embodiment of the present invention is shown in FIGS. 2-5.

Figure 2:
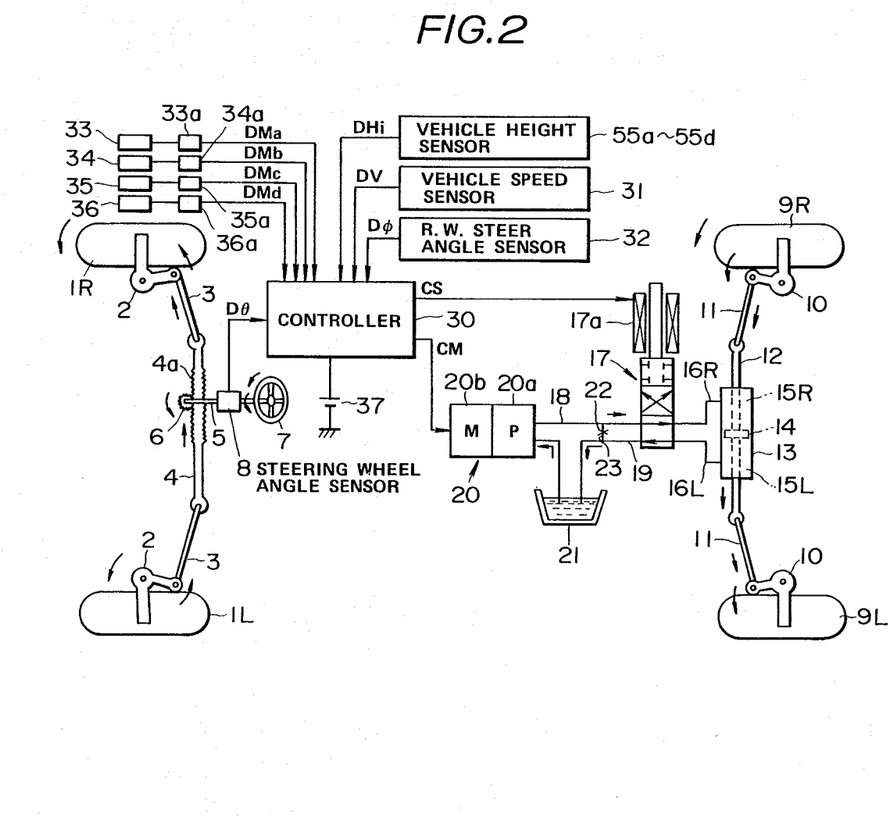
FIG. 2 is a schematic view showing a four wheel steer control system of a first embodiment of the present invention.

FIG. 2 shows one example of a four wheel steer system. Right and left front wheels 1R and 1L are rotatably supported, respectively, by right and left knuckle arms 2 which are swingably mounted on a vehicle body. The right and left knuckle arms 2 are connected to right and left ends of a rack rod 4 through right and left tie rods 3, respectively. The rack rod 4 is formed with a rack gear 4a which is engaged with a pinion 6 to form a rack and pinion type steering gear. The pinion 6 is provided at a bottom end of a steering shaft 5, and a steering wheel 7 is provided at a top end of the steering shaft 5. In the steering shaft 5, there is provided a steering wheel angle sensor 8, which delivers a steering wheel angle signal $D\theta$ indicative of a steering wheel angle and a steering direction, to a controller 30.

Right and left rear wheels 9R and 9L are rotatably supported, respectively, by right and left knuckle arms 10 which are swingably mounted on the vehicle body. Both knuckle arms 10 are connected with each other by a rear wheel steering rod 12 through right and left tie rods 11. The steering rod 12 serves as a rod of a hydraulic cylinder actuator 13 of a double acting double ended rod type. The cylinder actuator 13 has right and left power chambers 15R and 15L which are separated by a piston 14 integrally mounted on the steering rod 12. The right and left power chambers 15R and 15L are connected, respectively, through fluid passages 16R and 16L, to an electromagnetic directional control valve 17 having four ports and three positions. A solenoid 17a of the control valve 17 is supplied with an exciting current by the controller 30. The controller 30 can select one of the three positions of the control valve 17 by varying the magnitude of the current supplied to the solenoid 17a.

The control valve 17 is connected with a fluid pressure source 20 through a supply passage 18 and a return passage 19. A reservoir tank 21 is provided at an intermediate point in the return passage 19. The fluid pressure source 20 includes a fluid pump 20a and an electric motor 20b. The motor 20b is driven by a driving current supplied by the controller 30, and drives the pump 20a. A bypass passage 22 extends from the supply passage 18 to the return passage 19, and has an orifice 23 disposed therein.

A vehicle speed sensor 31 and a rear wheel steer angle sensor 32 are connected with the controller 30. The vehicle speed sensor 31 senses a vehicle speed, and delivers a vehicle speed signal DV representing the vehicle speed, to the controller 30. The rear wheel steer angle sensor 32 senses a steer angle of the rear wheels 9R and 9L, and delivers a rear wheel steer angle signal Dφ representing the rear wheel steer angle and the steering direction of the rear wheels 9R and 9L, to the controller 30.

Manually operated changeover switches 33, 34, 35 and 36 are connected with the controller 30. The switch 33 is one for selecting an automatic control steering mode. The switch 34 is one for selecting an opposite phase fixed ratio steering mode. The switch 35 is for selecting an in-phase fixed ratio steering mode, and 36 is for selecting a two wheel steering mode. When any one of the switches 33-36 is selected, a corresponding mode signal DMi (i is any one of a, b, c and d) is supplied to the controller 30.

In the automatic control mode, the controller 30 increases the steer angle ratio of the rear wheel steer angle to the front wheel steer angle as the vehicle speed increases. At high vehicle speeds, the controller 30 steers the rear wheels in the same direction as the front wheels by increasing the steer angle ratio to improve the stability during cornering. At low vehicle speeds, the controller 30 steers the rear wheels in the opposite direction to the steering direction of the front wheels by making the steer angle ratio negative to reduce the turning radius. In the opposite phase or in-phase fixed ratio mode, the steer angle ratio of the rear wheel steer angle to the front wheel steer angle is fixed without regard to the vehicle speed. (For example, the fixed steer angle ratio is equal to one.). The rear wheels are steered at a predetermined constant steer angle ratio in the direction opposite to the steering direction of the front wheels in the opposite phase fixed ratio mode. When the in-phase fixed ratio mode is selected, the rear wheels are steered in the same direction as the front wheel steering direction at a predetermined constant steer angle ratio. In the two wheel steering mode, only the front wheels are steered, and the rear wheels are not steered.

There are further provided indicators 33a, 34a, 35a and 36a, which are connected in series, respectively, with the mode switches 33-36 for indicating the steering mode selected by the driver, by means of light. A reference numeral 37 denotes a power supply such as a battery.

Figure 3:
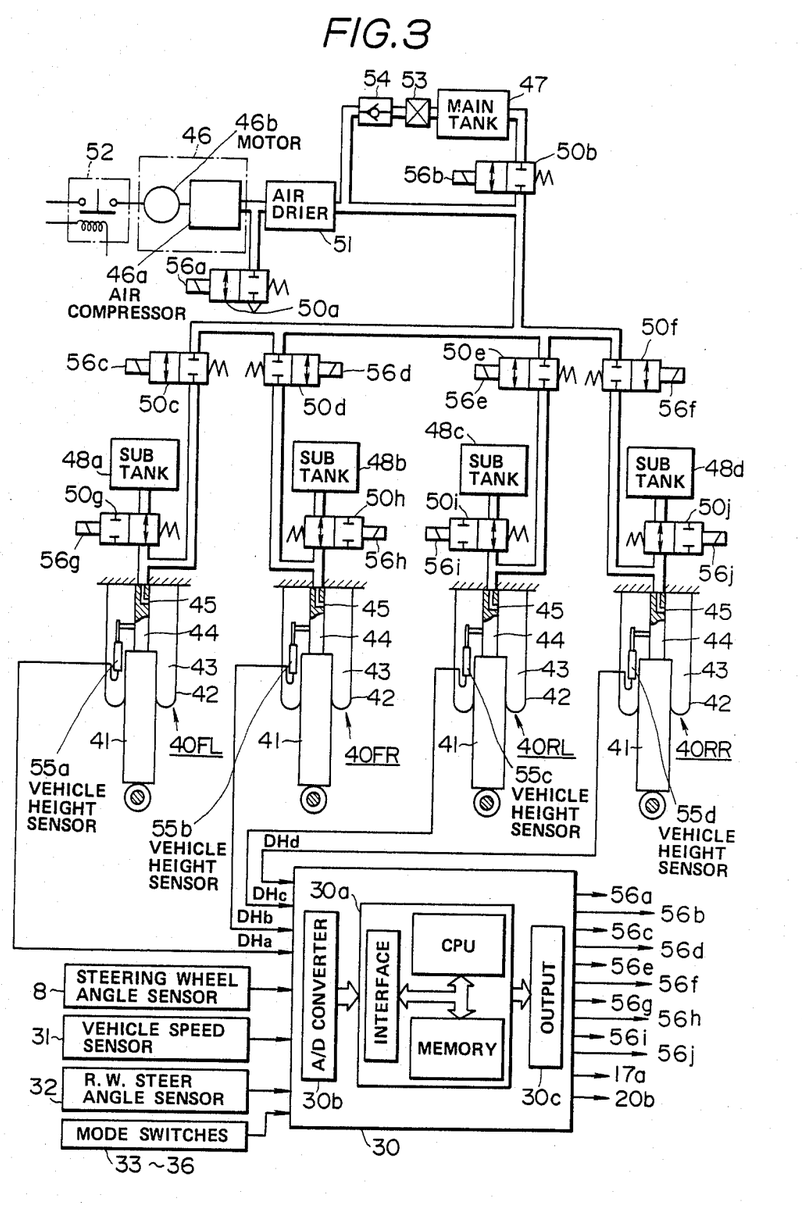
FIG. 3 is a schematic view of a suspension control system of the first embodiment of the present invention.

FIG. 3 shows one example of a suspension control system for varying a suspension characteristic. The suspension control system of FIG. 3 is designed to control the rates of air springs and the vehicle height.

This suspension control system includes four vehicle height adjusting actuators 40FL, 40FR, 40RL and 40RR supporting the four wheels 1L, 1R, 9L and 9R, respectively. Each of the actuators 40i (i=FL, FR, RL or RR) has a shock absorber 41 and an air chamber 43 formed at an upper part of the shock absorber by an elastic member 42 of a rubber or the like. In each actuator, an upper end of a piston rod 44 of the shock absorber 41 and an upper end of the elastic member 42 are attached to the vehicle body, and a lower end of the shock absorber 41 is connected with the corresponding wheel 1L, 1R, 9L or 9R.

Each of the air chambers 43 is connected, through a hole 45 formed in the piston rod 44 of the corresponding actuator, with a pneumatic circuit which has a single common circuit including a vehicle height adjusting fluid pressure source 46 and a main tank 47 for storing a high pressure air supplied from the pressure source 46, four sub tanks 48a-48d, and ten valves 50a-50j for opening and closing a passage. Each of the ten valves 50a-50j is a spring offset type electromagnetic selector valve having two ports and two positions. The fluid pressure source 46 has a motor 46a and an air compressor 46b. The valve 50a is disposed between the fluid pressure source 46 and an air drier 51, for serving as an exhaust valve. The valve 50b is disposed on the outlet side of the main tank 47 for serving as an intake valve. The four air chambers 43 are connected with the common circuit through respective branches. The valves 50c-50f are disposed in the four branches, respectively, for serving as an intake and exhaust valve. The air chambers of the actuators 40FL, 40FR, 40RL and 40RR are connected with both of the fluid pressure source 46 and the main tank 47 through the respective values 50c-50f. The four air chambers 43 of the actuators 40FL, 40FR, 40RL and 40RR are connected with the sub tanks 48a-48d, respectively. Each of the four valves 50g-50j is disposed between the corresponding air chamber 43 and the corresponding sub tank 48a, 48b, 48c or 48d, for serving as a spring constant adjusting valve.

The valves 50a-50j have respective solenoids 56a-56j. Each of the valves 50a-50j is opened and closed under command of a control signal produced by the controller 30. The controller 30 can increase and decrease the vehicle height by controlling the exhaust valve 50a, the intake valve 50b and the four intake-and-exhaust valves 50c-50f appropriately. When the air is supplied from the pressure source 46 through the main tank 47 to the air chamber 43 of each vehicle height adjusting actuator, then the air pressure in the air chamber 43 of each actuator is increased, and accordingly the vehicle height is continuously increased. The vehicle height is decreased when the air is drawn off from the air chamber 43 of each actuator and the air pressure is decreased. The controller 30 can change the spring constants by controlling the spring constant adjusting valves 50g-50j in the state in which the four intake-and-exhaust valves 50c-50f are held in the closed state. The spring constant of each air spring is changed from a high value to a low value and vice versa by changing the volume of the confined portion between the volume of only the air chamber 43 and the volume of the air chamber 43 and the sub tank 48a, 48b, 48c or 48d and vice versa. A relay 52 for actuating the motor 46a of the pressure source 46 is actuated by a signal produced by a pressure switch 53 disposed on the inlet side of the main tank 47. A check valve 54 is provided for preventing a return flow of the air from the main tank 47.

Height sensors 55a-55d are provided in the air chambers 43 of the actuators 40FL, 40FR, 40RL and 40RR, respectively. Each of the height sensors 55a-55d senses the height of a vehicle body portion on which the corresponding actuator 40FL, 40FR, 40RL or 40RR is mounted, by sensing the vertical displacement of the corresponding shock absorber 41. Each of the height sensors 55a–55d is made up of a potentiometer, and arranged to sense a relative displacement between the cylinder type and piston rod of the corresponding shock absorber 41, and to deliver a height signal DHa, DHb, DHc or DHd having a voltage corresponding to the stroke of the corresponding wheel, to the controller 30.

The controller 30 has a microcomputer 30a including an interface circuit, a central processing unit (CPU) and a memory section made up of one or more storage devices such as RAM and ROM, an A/D converter 30b, and an output circuit 30c. The mode signals DMa-DMd of the mode switches 33–36, the vehicle speed signal DV of the vehicle speed sensor 31, the steering wheel angle signal Dθ of the steering wheel angle sensor 8, the rear wheel steer angle signal Dφ of the rear wheel steer angle sensor 32, the height signals DHa-DHd of the height sensors 55a–55d are supplied to the CPU of the microcomputer 30a through the A/D converter 30b and the interface circuit. The CPU possesses the input signals according to one or more programs stored in the memory section, and delivers output signals through the interface circuit and the output circuit 30c. The output signals produced by the controller 30 are a control signal CM sent to the motor 20b of the rear wheel steering fluid pressure source 20 for supplying the driving current, and control signals CS, respectively, sent to the solenoid 17a of the control valve 17, and the solenoids 56a-56j of the ten valves 50a-50j, for supplying the exciting current.

The control system of this embodiment can control the rear wheel steering amount adequately even when the spring constant of the suspension system or the vehicle height is changed.

In the case of change in spring constant: When the spring constant of the front suspension is increased as compared with the rear suspension, the transfer of load during cornering is increased on the front side of the vehicle as compared with the rear of the vehicle, and accordingly the steer characteristic of the vehicle becomes understeer.

Figure 4:
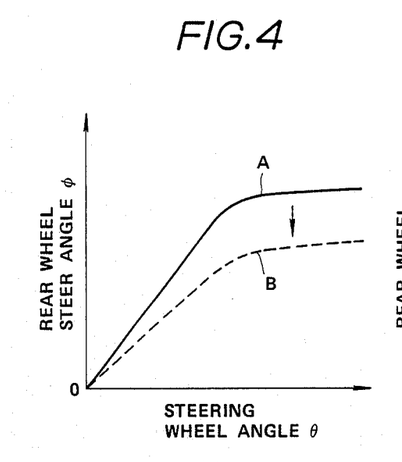
FIGS. 4 and 5 are graphs showing relationships between a steering wheel angle and a rear wheel steer angle.

Therefore, the controller 30 decreases the ratio of the rear wheel steer angle to the steering wheel angle, and changes the control characteristic from a characteristic A shown by a solid line A in FIG. 4 to a characteristic B of a broken line, by sending the control signals to the four wheel steering system. Thus, this control system prevents increase of the understeer tendency, and enables the vehicle to make a turn with the desired weak understeer characteristic.

In the case of change in vehicle height:

When the height of the front of the vehicle is increased, the roll center of the vehicle is heightened, and therefore, the steer characteristic of the vehicle becomes oversteer.

Figure 5:
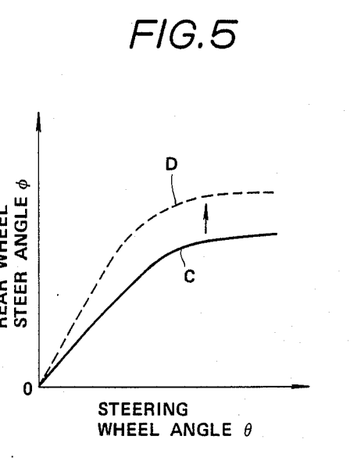

Accordingly, the controller 30 increases the ratio of the rear wheel steer angle to the steering wheel angle, and changes the control characteristic from a characteristic C shown by a solid line in FIG. 5 to a characteristic D of a broken line. Thus, the controller 30 prevents increase of the oversteer tendency, and maintains the ideal steer characteristic.

Figure 6:
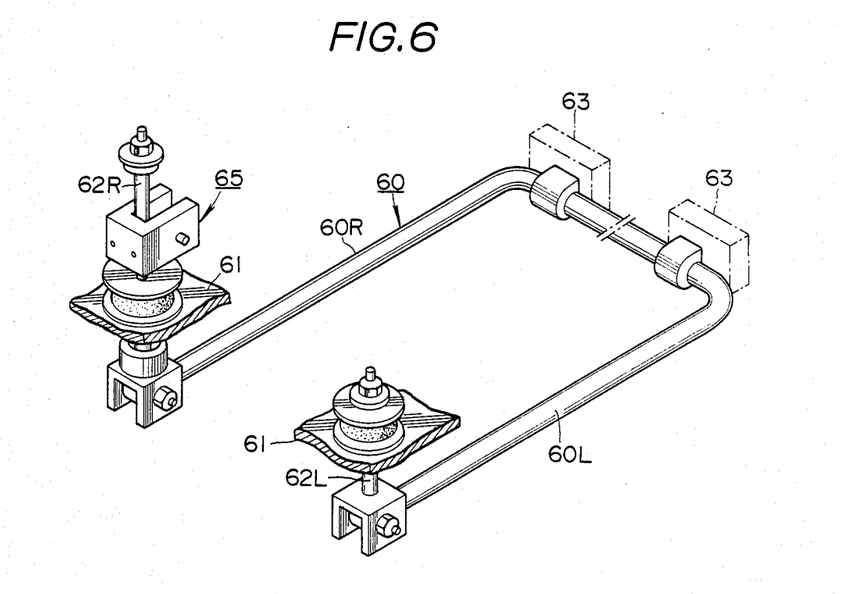
FIG. 6 is a perspective view of a stabilizer system included in a suspension control system of a second embodiment of the present invention.
Figures 7, 8:
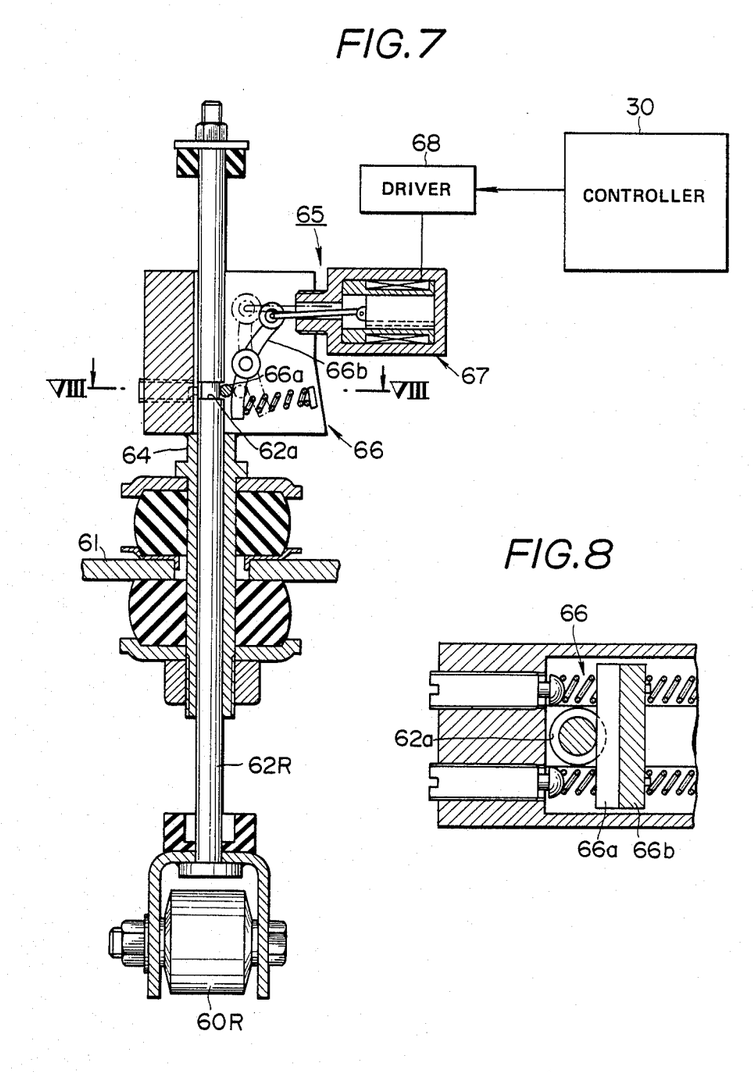
FIG. 7 is a sectional view of the stabilizer system of FIG. 6.
FIG. 8 is a sectional view taken across a line VIII—VIII of FIG. 6.

A second embodiment of the present invention is shown in FIGS. 6–8. The four wheel steer system of the second embodiment is arranged to control the rear wheel steering amount when the stiffness of a stabilizer 60 of the suspension system is changed. This stabilizer control system is disclosed in Japanese patent application No. 60-105382.

The stabilizer 60 is a U-shaped torsion bar. Right and left arm portions 60R and 60L of the stabilizer 60 are pivotally connected, respectively, with right and left connecting rods 62R and 62L which are slidably mounted on vehicle body brackets 61. A central portion of the stabilizer 60 is supported by suspension members 63 for supporting wheels. The left connecting rod 62L passes vertically through the vehicle body bracket 61, and the top end of the left connecting rod 62L is fixed to the vehicle body bracket 61 by means of screw.

The arrangement of the right connecting rod 62R shown in FIGS. 7 and 8 is disclosed in a U.S. patent application Ser. No. 781,684 filed on Sept. 30, 1985, U.S. Pat. No. 4,664,408 and a corresponding British patent application No. 8526485 published or May 14, 1986. The disclosures of these documents are incorporated herein by reference.

The right connecting rod 62R extends vertically through a bore of a tubular member 64 which passes vertically through the vehicle body bracket 61, and is attached to the vehicle body bracket 61 through rubber bushings. A roll stiffness adjusting unit 65 is provided on the top end of the tubular member 64. The right connecting rod 62R passes through both of the tubular member 64 and the roll stiffness adjusting unit 65. The roll stiffness adjusting unit 65 has a lock mechanism 66, an actuating mechanism 67 for actuating the lock mechanism 66 into locking and unlocking actions, and a driver circuit 68 for supplying the actuating mechanism 67 with a driving current in accordance with a control signal produced by the controller 30. The lock mechanism 66 has a stopper pin 66a and a lever 66b. When the lever 66b is rotated in the clockwise direction to a position shown by a solid line in FIG. 7, the stopper pin 66a is moved leftwardly in FIGS. 7 and 8 against the forces of springs, and engaged with an annular groove 62a formed in the right connecting rod 62R. In this state, the connecting rod 62R is fixed to the vehicle body bracket 61, and the right end of the stabilizer bar 60 is fixed to that it cannot move vertically. Thus, the roll stiffness adjusting unit 65 varies the roll stiffness of the stabilizer 60 in a manner of a two step control system by controlling the displacement of the connecting rod 62R relative to the vehicle body bracket 61.

The steering control system of this embodiment is arranged to control the rear wheel steering amount adequately when the roll stiffness of the stabilizer 60 of the suspension system is changed. When the roll stiffness of the front stabilizser is increased as compared with the roll stiffness of the rear stabilizer, the transfer of load during cornering is increased on the front side of the vehicle, and accordingly the vehicle steer characteristic becomes understeer as in the case of change of the suspension spring constant in the first embodiment. Therefore, the controller 30 decreases the ratio of the rear wheel steer angle to the steering wheel angle in the manner shown in FIG. 4, by sending the control signal to the four wheel steer system. Thus, the controller 30 maintains the desired weak understeer characteristic by repressing an increase of the understeer tendency.

Figure 9:
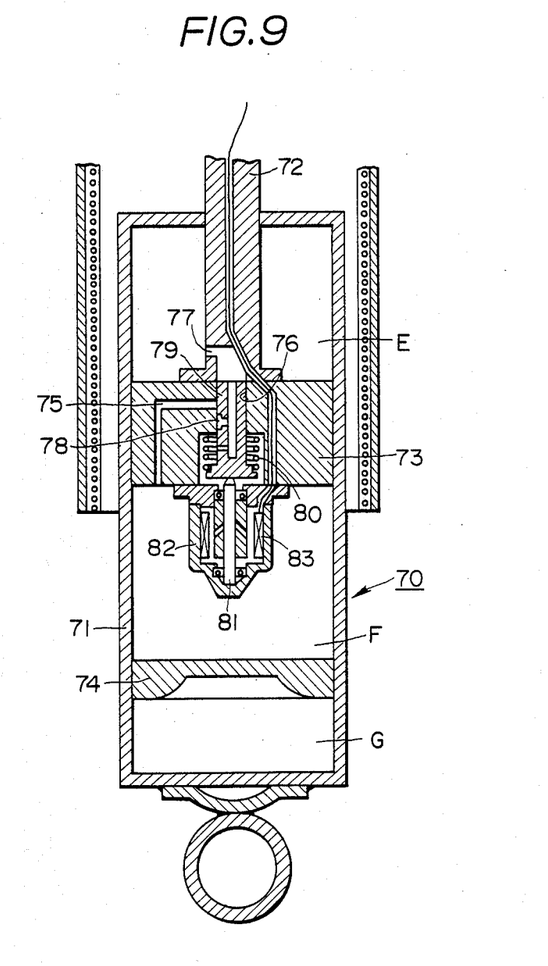
FIG. 9 is a sectional view of a shock absorber included in a suspension control system of a third embodiment of the present invention.

A third embodiment of the present invention is shown in FIG. 9. The suspension control system of the third embodiment shown in FIG. 9 is designed to vary a damping force of each shock absorber 70, and the controlling system of the third embodiment is designed to control the rear wheel steer angle in response to a change in the damping force. The shock absorber of FIG. 9 is disclosed in more detail in Japanese patent application No. 60-105382.

The shock absorber 70 of FIG. 9 has a cylinder tube 71 and a piston rod 72. A piston 73 is attached to a lower end of the piston rod 72, and slidable in the cylinder tube 71. The piston 73 separates fluid chambers E and F in the cylinder tube 71. A free piston 74 is slidably disposed in the cylinder tube 71, and separates the fluid chamber F and another chamber G. Working liquid is contained in the chambers E and F, and a high pressure gas is contained in the chamber G. The piston 73 is formed with a central hole 76. The top end of the hole 76 is in communication with the chamber E through a passage 77 formed in the piston rod 72. The piston 73 is further formed with a passage 75 extending from the central hole 76 to the chamber F. A spool 79 is slidably fitted in the central hole 76. The spool 79 is formed with a passage 78 which connects the passage 77 and the passage 75 when the spool 79 is in a prescribed position.

The spool 79 is normally urged downwardly by a return spring 80, and a plunger 81 limits the downward movement of the spool 79 by interposing between the lower end of the spool 79 and a case 82. In this state, the passage 78 is apart from an open end of the passage 75, and the passages 75 and 77 are disconnected from each other, so that the damping force is set at a large value. The plunger 81 is surrounded by an electromagnetic solenoid 83. When the solenoid 83 is energized, the pool 79 is moved upwardly against the biasing force of the return spring 80. Consequently, the passage 78 connects the passages 75 and 77, and increases the opening size between the passages 75 and 77, so that the damping force is decreased to a small value.

The controlling system of the third embodiment controls the rear wheel steering amount when the damping forces of the shock absorbers 70 are changed. When the damping force of the front suspension is increased as compared with the damping force of the rear suspension, the roll stiffness of the front is increased, and accordingly the vehicle steer characteristic becomes understeer. Therefore, the controller 30 of the third embodiment decreases the ratio of the rear wheel steer angle to the steering wheel angle as shown in FIG. 4. In this way, the third embodiment can maintain the desirable weak understeer characteristic by repressing an increase of the understeer tendency.

A fourth embodiment of the present invention is arranged to control the rear wheel steering amount when a camber angle of front wheels is changed. That is, in the fourth embodiment, the suspension control system shown in FIG. 1 is arranged to vary the camber. When the positive camber angle of the outside front wheel is increased, the cornering force is reduced, and accordingly the understeer tendency is increased. Therefore, the controller 30 of the fourth embodiment decreases the ratio of the rear wheel steer angle to the steering wheel angle as shown in FIG. 4. Thus, the control system of the fourth embodiment maintains the desired weak understeer characteristic by repressing an increase of the understeer tendency.

A fifth embodiment of the present invention is arranged to control the rear wheel steering amount when a toe-in of the front wheels is changed. That is, in the fifth embodiment, the suspension control system shown in FIG. 1 is arranged to vary the toe-in. When the toe-in of the front wheels is increased, the vehicle steer characteristic becomes oversteer. Therefore, the controller 30 of the fifth embodiment increases the ratio of the rear wheel steer angle to the steering wheel angle as shown in FIG. 5, by sending the control signal to the four wheel steer system. Thus, the fifth embodiment can provide the desired cornering characteristic by repressing the oversteer tendency.

In the above-mentioned embodiments, the means for sensing the suspension characteristic shown in FIG. 1 is made up of the controller 30. However, the suspension characteristic sensing means may be provided separately. Furthermore, the controller 30 may be composed of electronic circuits such as comparating circuits and logic circuits, instead of the microcomputer.

What is claimed is:

1. A four wheel steer vehicle comprising:
   suspension control means for varying a suspension characteristic of said vehicle,
   means for sensing said suspension characteristic by sensing a condition of said suspension control means and sending a sensor signal,
   a four wheel steer system for steering right and left rear wheels in response to a control signal, and
   controlling means for receiving said sensor signal and determining a ratio of a rear wheel steer angle to a steering wheel angle in accordance with said suspension characteristic sensed by said suspension characteristic sensing means and causing the rear wheels to be steered to an angle according to said ratio by sending said control signal.

2. A vehicle according to claim 1 wherein said controlling means decreases said ratio in response to a change in said suspension characteristic which increases understeer tendency and increases said ratio in response to a change in said suspension characteristic which increases oversteer tendency.

3. A vehicle according to claim 2 wherein said suspension control means varies said suspension characteristic by varying a condition of a suspension system of said vehicle.

4. A vehicle according to claim 2 wherein said suspension control means varies a stiffness of a suspension spring of said vehicle, and said controlling means decreases said ratio of said rear wheel steer angle to said steering wheel angle when a difference obtained by subtracting a spring constant of a rear suspension from a spring constant of a front suspension is increased.

5. A vehicle according to claim 2 wherein said suspension control means varies a vehicle height of said vehicle, and said controlling means increases said ratio of said rear wheel steer angle to said steering wheel angle when the height of the front of said vehicle is increased.

6. A vehicle according to claim 2 wherein said suspension control means varies a roll stiffness of at least one of front and rear stabilizer bars, and said controlling means decreases said ratio of said rear wheel steer angle to said steering wheel angle when a difference obtained by substracting the roll stiffness of said rear stabilizer bar from the roll stiffness of said front stabilizer bar is increased.

7. A vehicle according to claim 2 wherein said suspension control means varies a damping force of at least one of front and rear suspensions, and said controlling means decreases said ratio of said rear wheel steer angle to said steering wheel angle when a difference obtained by substracting the damping force of said rear suspension from the damping force of said front suspension is increased.

8. A vehicle according to claim 2 wherein said suspension control means varies a wheel alignment angle.

9. A vehicle according to claim 8 wherein said suspension control means varies a camber angle of front wheels of said vehicle, and said controlling means decreases said ratio of said rear wheel steer angle to said steering wheel angle when the positive camber angle of said front wheels is increases.

10. A vehicle according to claim 8 wherein said suspension control means varies a toe-in of front wheels of said vehicle, and controlling means increases said ratio of said rear wheel steer angle to said steering wheel angle when the toe-in of said front wheels is increased.

* * * * *